United States Patent
Narumi et al.

(10) Patent No.: US 8,130,625 B2
(45) Date of Patent: Mar. 6, 2012

(54) OPTICAL INFORMATION RECORDER/REPRODUCER, OPTICAL INFORMATION RECORDING/REPRODUCING METHOD AND CONTROL CIRCUIT

(75) Inventors: Kenji Narumi, Osaka (JP); Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 255 days.

(21) Appl. No.: 12/377,500

(22) PCT Filed: Oct. 15, 2007

(86) PCT No.: PCT/JP2007/070045
§ 371 (c)(1),
(2), (4) Date: Feb. 13, 2009

(87) PCT Pub. No.: WO2008/047741
PCT Pub. Date: Apr. 24, 2008

(65) Prior Publication Data
US 2010/0232264 A1 Sep. 16, 2010

(30) Foreign Application Priority Data
Oct. 20, 2006 (JP) ................................. 2006-285922

(51) Int. Cl.
*G11B 7/135* (2012.01)
*G11B 7/00* (2006.01)
(52) U.S. Cl. .............. 369/112.24; 369/44.14; 369/44.23
(58) Field of Classification Search ................. 369/44.14
See application file for complete search history.

(56) References Cited

U.S. PATENT DOCUMENTS

| | | | |
|---|---|---|---|
| 6,404,710 B1 | 6/2002 | Ichimura et al. | |
| 6,568,594 B1 | 5/2003 | Hendriks et al. | |
| 6,791,913 B1 | 9/2004 | Ishimoto | |
| 7,158,452 B2 | 1/2007 | Ishibashi et al. | |
| 7,406,016 B2 | 7/2008 | Ishimoto | |
| 2002/0159342 A1* | 10/2002 | Ogasawara et al. | 369/44.23 |
| 2002/0163869 A1 | 11/2002 | Ishimoto | |
| 2004/0047271 A1* | 3/2004 | Mizuno | 369/112.24 |
| 2004/0076090 A1* | 4/2004 | Ishibashi et al. | 369/44.29 |
| 2005/0111312 A1 | 5/2005 | Song | |
| 2005/0190666 A1* | 9/2005 | Ishimoto | 369/44.25 |
| 2008/0279070 A1 | 11/2008 | Zijp et al. | |
| 2009/0190461 A1 | 7/2009 | Van Der Mark et al. | |
| 2009/0290456 A1* | 11/2009 | Futakuchi et al. | 369/44.23 |

FOREIGN PATENT DOCUMENTS

JP 2001-76358 3/2001
(Continued)

OTHER PUBLICATIONS

International Search Report issued Nov. 20, 2007 in the International (PCT) Application No. PCT/JP2007/070045.

(Continued)

*Primary Examiner* — Joseph Haley
*Assistant Examiner* — Nicholas Lee
(74) *Attorney, Agent, or Firm* — Wenderoth Lind & Ponack, L.L.P.

(57) ABSTRACT

A distance control circuit keeps constant the distance between a condensing member and the surface of an optical disk using return light from a region where near field light is generated. Additionally, a focus control circuit controls the focus position of the near field light to sustain it at the position of an information layer using reflection light from the information layer.

13 Claims, 6 Drawing Sheets

FOREIGN PATENT DOCUMENTS

| | | |
|---|---|---|
| JP | 2003-517172 | 5/2003 |
| JP | 2004-30821 | 1/2004 |
| JP | 2004-46915 | 2/2004 |
| JP | 2004-247024 | 9/2004 |
| JP | 2005-209246 | 8/2005 |
| WO | 02/067250 | 8/2002 |
| WO | 03/071527 | 8/2003 |
| WO | 2005/104109 | 11/2005 |
| WO | 2005/104115 | 11/2005 |
| WO | WO 2005104109 A1 * | 11/2005 |

OTHER PUBLICATIONS

Supplementary European Search Report issued Apr. 8, 2010 in Application No. EP 07 82 9779.

* cited by examiner

OPTICAL INFORMATION RECORDER/REPRODUCER, OPTICAL INFORMATION RECORDING/REPRODUCING METHOD AND CONTROL CIRCUIT

BACKGROUND OF THE INVENTION

1. Technical Field

The present invention relates to a recorder/reproducer and a recording/reproducing method for an optical information recording medium for optically recording and/or reproducing information, and more particularly, to focus control of a recorder/reproducer using near field light.

2. Background Art

There is proposed a technique using near field light as a system capable of recording and reproducing data into/from an optical disk with high density. It is an optical system combining a condensing lens and solid immersion lens (SIL) that is attracting attention as a condensing optics for producing near field light in recent years. This combination can realize a numerical aperture higher than the NA (numerical aperture) of the condensing lens. Increasing the numerical aperture of an optical system reduces the spot size and can thereby realize higher density recording.

Since the optical system using the SIL needs to cause light exuding from the exit surface of the SIL to be incident on the surface of an optical disk, the optical system is required to extremely shorten the distance between the SIL and the surface of the optical disk. In an optical system such as a DVD, the distance between the objective lens and the surface of the optical disk is approximately 1 mm, while in the case of the SIL, the distance between the SIL and the surface of the optical disk needs to be reduced to approximately 100 nm or less. Furthermore, when the distance between the SIL and the surface of the optical disk varies, near field light may not be obtained or the SIL may collide with the optical disk. Therefore, such control is also required that keeps constant the distance between the SIL and the surface of the optical disk.

There is proposed a method using an air slider to realize such control. This method uses a configuration with a SIL mounted on a slider. That is, when an optical disk rotates, an air flow is produced between the surface of the optical disk and the slider and the air flow makes the slider float and thereby keeps constant the distance between the SIL and the surface of the optical disk.

Furthermore, a method called a "gap servo" is proposed as another control method. This method is disclosed, for example, in Patent Document 1. This method detects the quantity of reflection light from an optical disk based on near field light, adjusts the positions of the condensing lens and SIL in the optical axis direction so that the light quantity approximates to a constant value to thereby control the distance between the SIL and the surface of the optical disk (that is, the gap).

However, the above described conventional method using an air slider has the following problems.

Control over the air slider is merely passive control that is flotation by an air flow and never actively controls the position of the SIL. Therefore, when, for example, locally varying irregularities exist on the surface of the optical disk, the position of the SIL cannot follow the variation, which may cause the SIL to collide with the surface of the optical disk. On the other hand, attempting to prevent locally varying irregularities on the surface of the optical disk requires the surface to be mirror-finished after the optical disk is manufactured, which constitutes a factor of increasing the manufacturing cost.

Attempting to control the air flow so that the slider follows the above described varying irregularities as much as possible may complicate the design of the slider shape. Furthermore, not only varying irregularities of the surface but also warpage of the optical disk itself (called "tilt") constitutes a factor of reducing the tracking capability of the SIL. Furthermore, when the number of revolutions of the optical disk is changed, the air flow changes, which also results in a problem that the gap deviates from a desired distance.

The above described conventional method using the air slider as well as the above described conventional method using the gap servo involve the following problems.

A first problem is that when the distance between the optical disk surface and an information layer where information is actually recorded is not constant, a defocused state may occur with respect to the information layer. Inserting a protective layer between the information layer and the surface of the optical disk for the purpose of protecting the information layer may vary the distance between the surface of the optical disk and the information layer due to variations in thickness of the protective layer produced in manufacturing steps. In such a case, although the gap can be kept constant, the state of focusing on the information layer cannot help but be changed.

A second problem is that there may be a problem in recording and reproducing data into/from a disk with a plurality of information layers provided in the optical axis direction, a so-called multilayered disk. That is, in the multilayered disk, the distance of each information layer from the surface of the disk varies from each other, but according to the conventional method, it is indeterminate at what distance from the surface of the disk laser light is focused when the gap servo is operated. Therefore, when the gap servo is operated, if laser light is focused on any layer of the information layers by accident, information recorded in the information layer may be mistakenly erased or destroyed and such a probability increases as the number of information layers increases.

Patent Document 1: Japanese Patent Laid-Open No. 2001-76358

SUMMARY OF THE INVENTION

The present invention has been implemented to solve the above described conventional problems and it is an object of the present invention to provide an optical information recorder/reproducer capable of appropriately keeping focus on an information layer even if local irregularities occur on the surface of an optical information recording medium or the distance between the surface of the optical information recording medium and the information layer varies. Furthermore, it is another object of the present invention to provide an optical information recorder/reproducer capable of appropriately selecting any information layer of a multilayered disk without causing erroneous erasure or destruction and appropriately keeping focus on the information layer.

The optical information recorder/reproducer according to an aspect of the present invention is an optical information recorder/reproducer that records and/or reproduces information into/from an optical information recording medium having an information layer using near field light, including a condensing member for generating the near field light, a distance detection section that detects a distance between the condensing member and the optical information recording medium using return light from a region where the near field light is generated, a distance control section that controls the distance between the condensing member and the optical information recording medium, a focus position changing member that changes the focus position of the near field light in the optical information recording medium, a focus detection section that detects the state of focus on the information layer using reflection light from the information layer, and a focus control section that focuses the near field light on the information layer, wherein the distance control section controls the distance between the condensing member and the optical information recording medium so as to be constant based on the detection result of the distance detection section, the focus detection section detects the focused state and the focus control section controls the focus position changing member so that the near field light is focused on the information layer based on the detection result of the focused state with the distance between the condensing member and the optical information recording medium controlled so as to be constant.

This optical information recorder/reproducer can appropriately keep focus on the information layer even if local irregularities occur on the surface of the optical information recording medium and the distance between the surface of the optical information recording medium and the information layer varies.

DETAILED DESCRIPTION OF THE INVENTION

Hereinafter, the present invention will be explained in further detail using the following embodiments.

Configuration of Embodiment 1

Figure 1:
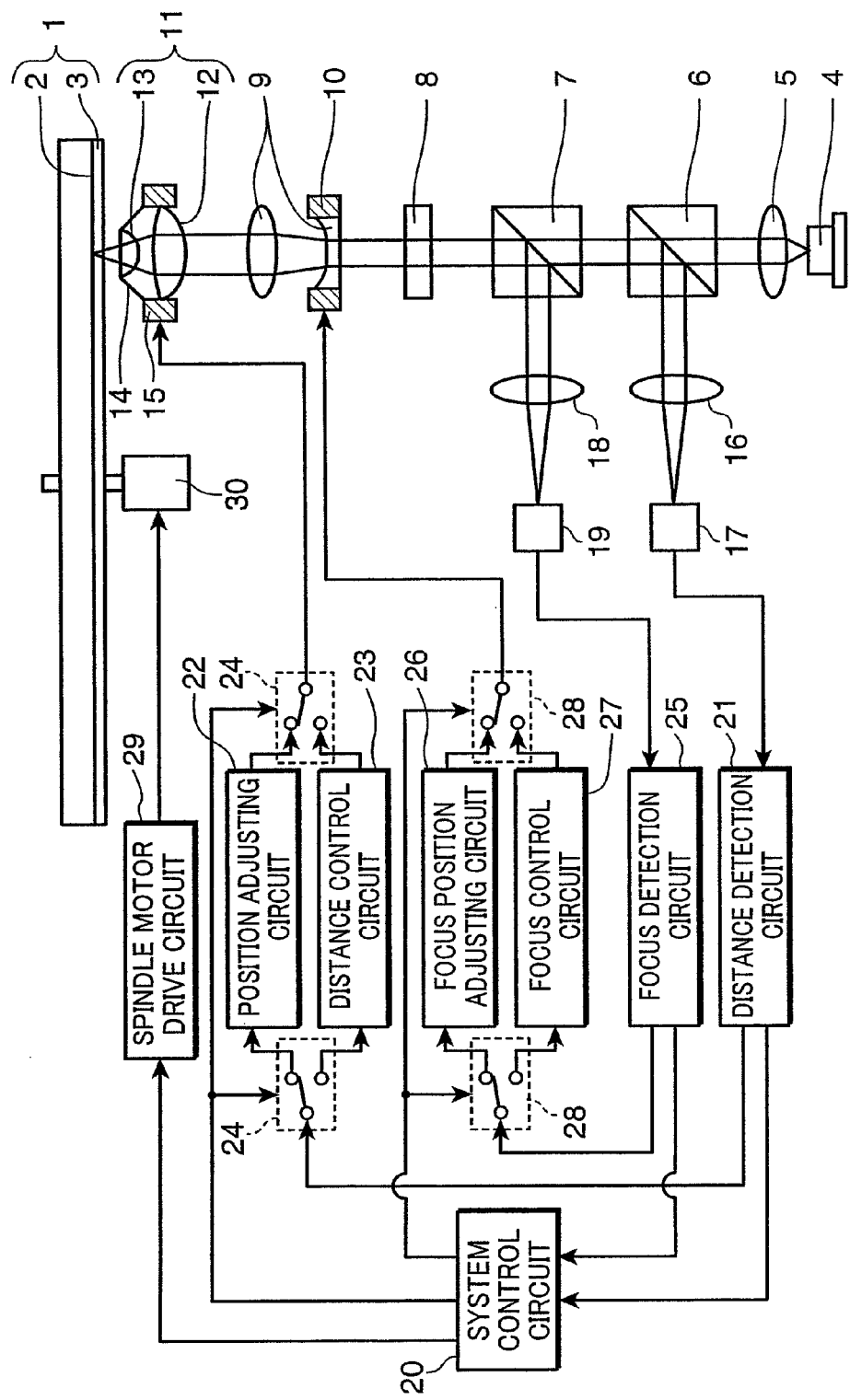
FIG. 1 is a block diagram showing a configuration of an optical information recorder/reproducer according to Embodiment 1 of the present invention.
Figure 2:
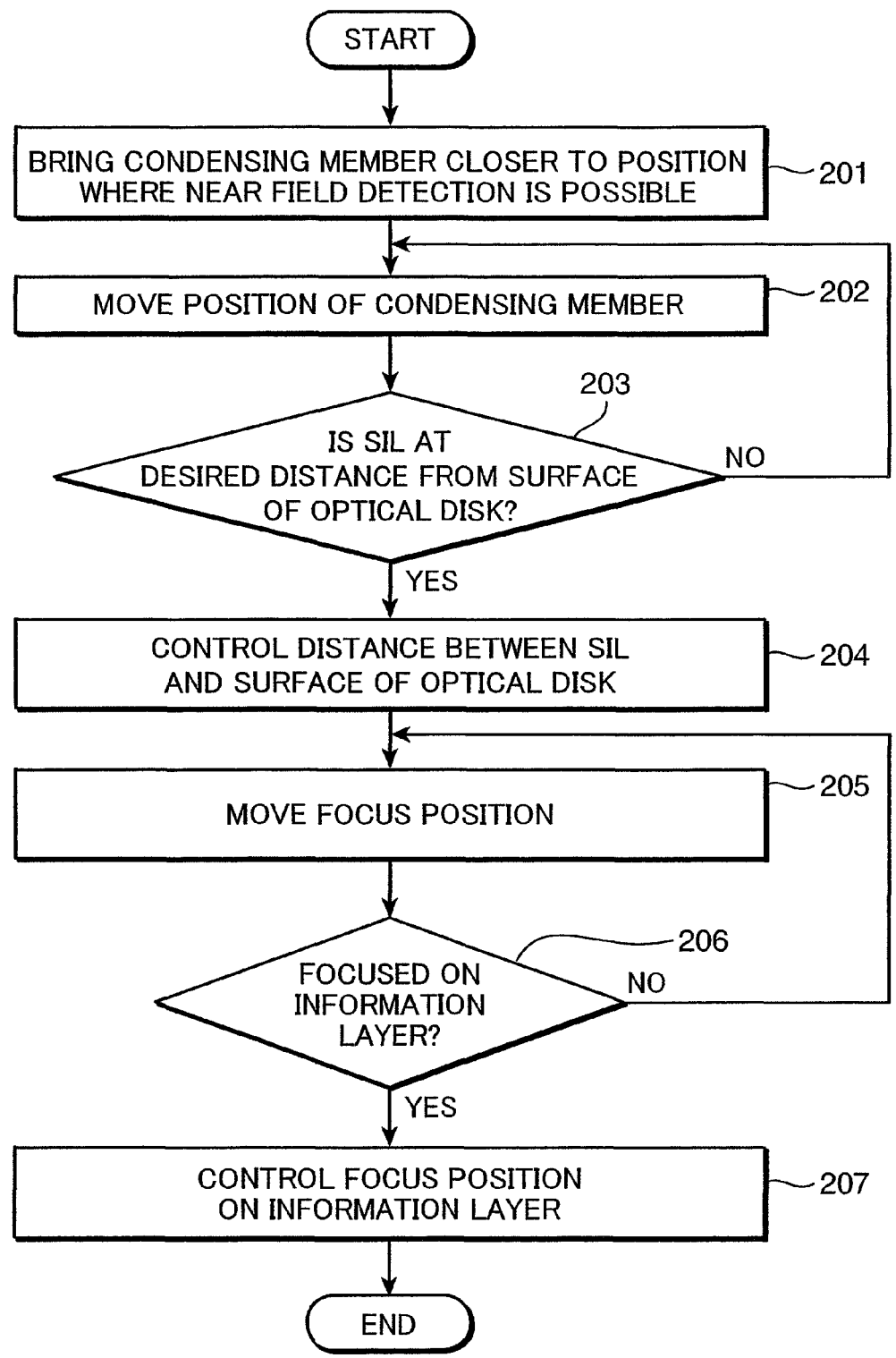
FIG. 2 is a flowchart illustrating the operation of the optical information recorder/reproducer according to Embodiment 1 shown in FIG. 1.

First, the operation for focus control of an optical information recorder/reproducer according to Embodiment 1 of the present invention will be explained using FIG. 1, FIG. 2 and FIG. 3. FIG. 1 is a block diagram showing a schematic configuration of the recorder/reproducer of Embodiment 1 of the present invention.

First, a forward path optical system located in an optical path from a laser to an optical disk and a configuration of the optical disk will be explained. In FIG. 1, reference numeral 1 denotes an optical disk that records and/or reproduces data (information) and the optical disk 1 includes an information layer 2 into which information is actually recorded and a protective layer 3 that protects the information layer 2. Reference numeral 4 denotes a laser that becomes a light source of recording and/or reproduction and reference numeral 5 denotes a collimator lens that converts laser light emitted from the laser 4 to parallel light.

Both reference numerals 6 and 7 denote beam splitters for splitting the reflection light from the optical disk 1 and the beam splitter 6 is of a type whose reflection characteristic is independent of the polarization direction (that is, unpolarized beam splitter), whereas the beam splitter 7 is of a type whose reflection characteristic depends on the polarization direction (that is, polarized beam splitter). The unpolarized beam splitter 6 has the role of separating return light from a region in which near field light is generated and the polarized beam splitter 7 has the role of separating reflection light from the information layer 2 (that is, far-field light). Reference numeral 8 denotes a quarter-wave plate that converts linear polarization to circular polarization so that the polarized beam splitter 7 can separate reflection light of the far-field light.

Reference numeral 9 denotes a beam expander for expanding the beam diameter of laser light. An actuator 10 is attached to at least one of two lenses making up the beam expander 9, which allows the distance between the two lenses to be adjusted. This makes it possible to change the focus position of near field light in the optical disk 1 and adjust the focus position in a desired position. The focus position changing member applicable to the present invention is not limited to the beam expander 9 and may also be a lens or optical element for adjusting the focus position provided in the optical path independently of the beam expander. Furthermore, a variety of actuators can be used as the actuator 10 and a moving coil type actuator may be used, for example.

Reference numeral 11 denotes a condensing member for generating near field light and the condensing member 11 is made up of two lenses; a condensing lens 12 and a SIL (solid immersion lens) 13. For example, a semi-spherical lens is used as the SIL 13 and the flat side thereof faces the surface of the optical disk 1.

In this way, the use of the SIL 13 can equivalently increase the NA of the condensing member 11 to a value greater than 1. Here, since there is no way that laser light can be incident on the optical disk at an angle equal to or greater than 90 degrees with respect to the optical axis in a normal optical system, the logical limit value of the NA is 1, and assuming the wavelength of the laser light is $\lambda$, the spot size of converging light is proportional to $\lambda/NA$. However, assuming the refractive index of the medium of the SIL is n, since the wavelength in the medium of the SIL is $\lambda/n$, the spot size of the light exuding from the SIL is proportional to $\lambda/(n \cdot NA)$. Therefore, the use of the SIL for the condensing member 11 allows the equivalent NA of the condensing member 11 to be greater than 1 and has the effect of reducing the spot size.

The condensing lens 12 and the SIL 13 are fixed as one piece by a lens holder 14 and attached to an actuator 15. This actuator 15 allows the distance between the surface of the optical disk 1 and the SIL 13 to be adjusted. A variety of actuators can be used as the actuator 15 and, for example, a moving coil type actuator may be used.

A turntable is fixed to the rotating shaft of a spindle motor 30, the optical disk 1 is mounted on the turntable and the spindle motor 30 rotates the optical disk 1. The optical information recording medium to which the present invention is applicable is not limited to the optical disk and recording media in other modes such as an optical card may also be used.

Next, the backward path optical system from the optical disk 1 to a detector will be explained. The backward path light reflected by the unpolarized beam splitter 6 is condensed by a first detection lens 16 and is incident on a first detector 17. The light quantity of light incident upon this first detector 17 corresponds to the light quantity of return light from the region in which the near field is generated. This light quantity varies depending on the distance between the surface of the SIL 13 (surface on the optical disk 1 side) and the surface of the optical disk 1. When the surface of the SIL 13 completely contacts the surface of the optical disk 1, the transmission of the forward path light incident upon the SIL 13 through the surface the optical disk 1 becomes a maximum and the light quantity of the return light thereby becomes a minimum. On the other hand, when there is a sufficient distance between the surface of the SIL 13 and the surface of the optical disk 1, no near field light is generated, and therefore the light of a ring zone of the light incident upon the SIL 13 is totally reflected and the light quantity of return light becomes a maximum. In a position intermediate between the two cases, the light quantity of return light changes substantially in proportion to the distance between the SIL 13 and the optical disk 1. Therefore, when near field light has been generated by the SIL 13, it is possible to detect the distance between the surface of the SIL 13 and the surface of the optical disk 1 by detecting the light quantity of light incident upon the first detector 17.

Furthermore, the backward path light reflected by the polarized beam splitter 7 is condensed by a second detection lens 18 and is incident on a second detector 19. The light incident upon this second detector 19 corresponds to the light reflected by the information layer 2 of the optical disk 1. What is important here is that it is not until the distance between the surface of the SIL 13 and the surface of the optical disk 1 is controlled so that near field light is generated that the laser light transmits between the SIL 13 and the optical disk 1 and reflection light from the information layer 2 can be obtained.

The second detection lens 18 is intended not only to condense backward path light to the second detector 19 but also to detect the focused state. For example, the configuration of the second detection lens 18 may also be a combination lens to detect a focused state using an anastigmatic method. The second detector 19 is intended to detect a focused state and tracking state. For this purpose, the configuration of the second detector 19 is more preferably a light-receiving element divided into a plurality of portions.

Hereinafter, the electrical system and control system will be explained. In FIG. 1, a tracking control circuit or the like is omitted, but various tracking control circuits can be used as the tracking control circuit and, for example, a tracking control circuit or the like used for a conventional DVD, BD (Blu-ray Disc) or the like may also be used.

A system control circuit 20 is a circuit that controls the entire recorder/reproducer such as focus control in the present embodiment. A spindle motor drive circuit 29 is a circuit that controls the number of revolutions of the spindle motor 30, that is, the linear speed of the optical disk 1.

A distance detection circuit 21 is a circuit that converts the quantity of light received at the first detector 17 to an electric signal (voltage value). A position adjusting circuit 22 is a circuit that causes a drive current to flow through the actuator 15 based on the electric signal from the distance detection circuit 21 to adjust the position of the condensing member 11 in the optical axis direction. The position adjusting circuit 22 may also control the actuator 15 by using a detection signal of another position sensor that can measure the distance between the surface of the SIL 13 and the surface of the optical disk 1 or simply controlling the drive current of the actuator 15 in a feedforward manner.

A distance control circuit 23 is a circuit that changes the drive current of the actuator 15 so that the electric signal from the distance detection circuit 21 becomes constant and thereby controls the actuator 15 so as to keep constant the distance between the surface of the SIL 13 and the surface of the optical disk 1. A switching circuit 24 is a circuit that selects the position adjusting circuit 22 or the distance control circuit 23 to control the position of the condensing member 11.

Here, in the present embodiment, suppose coarse control under which the position adjusting circuit 22 moves the condensing member 11, that is, the SIL 13 with respect to the optical disk 1 is called "position adjustment" and precise control under which the distance control circuit 23 keeps the distance between the surface of the SIL 13 and the surface of the optical disk 1 to a constant value with a high degree of accuracy is called "distance control."

A focus detection circuit 25 is a circuit that detects a focused state based on the light received by the second detector 19. The electric signal outputted from this focus detection circuit 25 is preferably generated as a focus error signal (that is, an S-figured curve signal) assumed to be "0" when light is focused on the information layer, a "positive voltage" when focused forward or a "negative voltage" when focused backward viewed from the incident side from the standpoint of focus control, which will be described later. The relationship between the focus position and the polarity of voltage may be opposite to that described above.

A focus position adjusting circuit 26 is a circuit that causes a drive current to flow through the actuator 10 based on the electric signal from the focus detection circuit 25 in order to adjust the focus position of laser light (near field light) in the optical disk 1. The focus position adjusting circuit 26 may also control the actuator 10 by using a detection signal of another position sensor that can measure the focus position of laser light in the optical disk 1 or simply controlling the drive current of the actuator 10 in a feedforward manner.

A focus control circuit 27 is a circuit that changes the drive current of the actuator 10 so that the electric signal (voltage value) from the focus detection circuit 25 becomes 0 or a constant value and thereby controls the actuator 10 so as to keep the focus position of laser light to the position of the information layer 2. The switching circuit 28 is a circuit that selects the focus position adjusting circuit 26 or focus control circuit 27 to adjust the focus position.

Here, suppose a focus (focused focal) position in the present embodiment means a position where laser light is most narrowed down in the optical axis direction (focus direction) and the spot size becomes a minimum, coarse control under which the focus position adjusting circuit 26 moves the focus position in the focus direction is called "focus position adjustment" and precise control under which the focus control circuit 27 causes the focus position to align with the information layer with a high degree of accuracy is called "focus control."

Operation of Embodiment 1

Next, the operation of the optical information recorder/reproducer of the present embodiment will be explained using the block diagram in FIG. 1, a flowchart in FIG. 2 and a signal diagram in FIG. 3.

Figure 3:
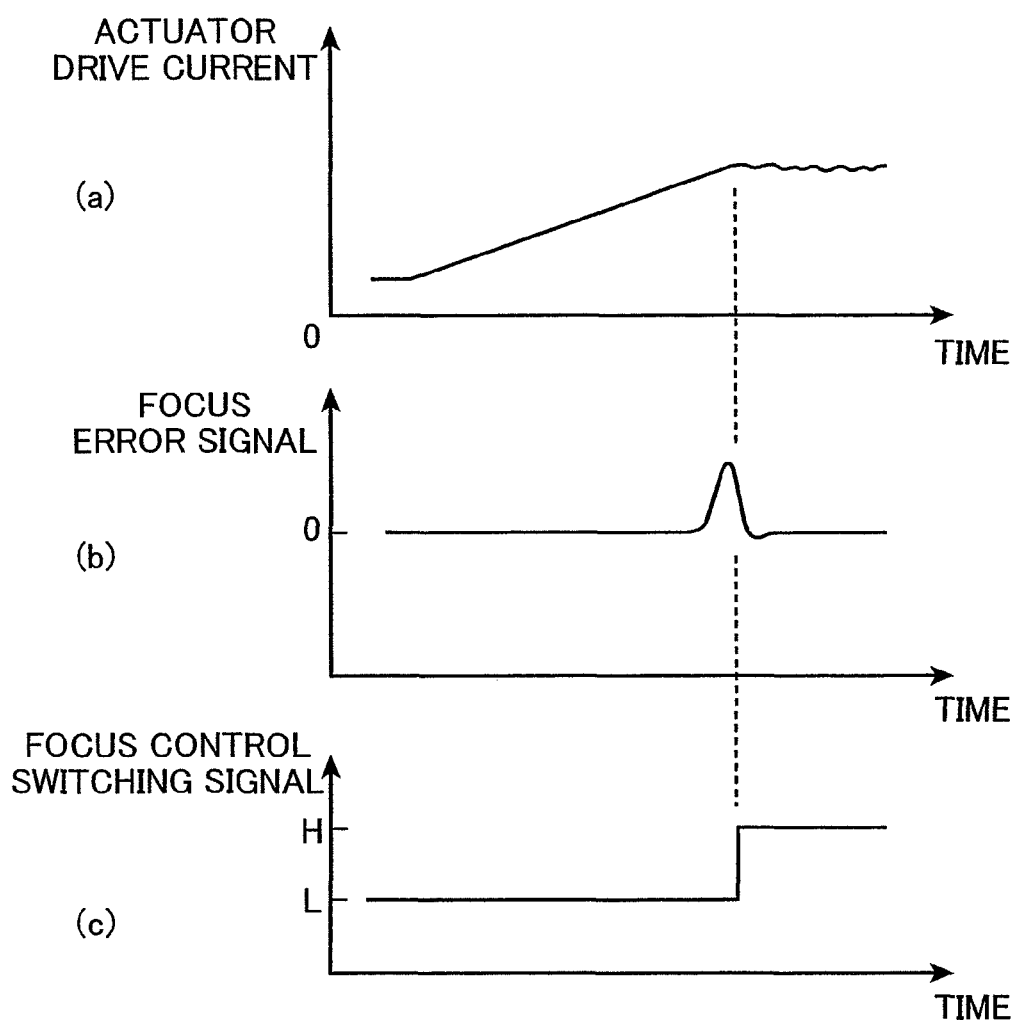
FIG. 3 is a signal waveform diagram showing the operation of focusing on the information layer according to Embodiment 1 shown in FIG. 1.

FIG. 3 is a signal diagram illustrating the operation of performing focus control over the information layer according to the present embodiment. FIG. 3(*a*) shows a drive current of the actuator 10, FIG. 3(*b*) shows a focus error signal outputted from the focus detection circuit 25 and FIG. 3(*c*) is a focus control switching signal outputted from the system control circuit 20.

The operation of the recorder/reproducer until information is actually recorded or reproduced generally includes a step of rotating the optical disk 1, a step of irradiating laser light, a step of performing focus control operation and a step of performing tracking control operation, and a series of steps of performing focus control operation will be explained here. The rotation of the optical disk 1 may be performed after the step of performing focus control operation.

At the time of reproducing or recording data from/into the optical disk 1, first in a condensing member approaching step 201 (step 201 will be abbreviated to S201 and so on), the system control circuit 20 switches the switching circuit 24 to the position adjusting circuit 22 side and the position adjusting circuit 22 drives the actuator 15 while monitoring an electric signal from the distance detection circuit 21 and causes the condensing member 11 to approach from an initial position sufficiently away from the optical disk 1 (e.g., several μm to 1 mm) to a position where it is possible to detect near field (that is, position where it is possible to generate near field light). For example, when the wavelength of laser light is 400 nm, the condensing member 11 may be moved to a position where the distance between the SIL 13 and the surface of the optical disk 1 becomes approximately 100 nm.

In this step S201, there may also be a method of setting the initial position of the condensing member 11 at a position where it is possible to detect near field from the beginning, but there is a possibility that the SIL 13 may collide with the optical disk 1 due to disturbance vibration from the recorder/reproducer or runout the surface of the optical disk 1. Therefore, it is preferably approached from a position sufficiently away from the optical disk 1 as the initial position, as in the present embodiment. In this case, an electric signal from the distance detection circuit 21 may be used as the method of detecting whether or not it is possible to detect near field at that position.

In a condensing member moving step S202, the position adjusting circuit 22 drives the actuator 15 to move the condensing member 11 closer to the optical disk 1 while monitoring the electric signal from the distance detection circuit 21.

In a distance deciding step S203, the system control circuit 20 decides whether the voltage value of the electric signal from the distance detection circuit 21 is a voltage corresponding to a desired distance (e.g., 20 nm). When the voltage value is not the voltage corresponding to the desired distance, the condensing member moving step S202 is repeated and the system control circuit 20 further causes the position adjusting circuit 22 to move the condensing member 11 closer.

When the voltage corresponding to the desired distance is reached, the system control circuit 20 switches the switching circuit 24 to the distance control circuit 23 side in a distance controlling step S204. The distance control circuit 23 controls the actuator 15 using the electric signal from the distance detection circuit 21 so that the distance between the surface of the SIL 13 and the surface of the optical disk 1 is kept to the above described desired distance.

If there is slightest overshoot or undershoot in the movement of the SIL 13 at the moment of switching to the operation of controlling the distance to be constant, the SIL 13 may collide with the surface of the optical disk 1. Therefore, it is desirable to remove disturbance factors as much as possible at the moment of starting the operation of controlling the gap (the distance between the surface of the SIL 13 and the surface of the optical disk 1).

For example, since the rotation of the optical disk 1 becomes a factor of disturbance, at the moment of starting operation of controlling the distance to be constant, that is, when the distance control circuit 23 starts to control the distance between the surface of the SIL 13 and the surface of the optical disk 1 to be constant, the system control circuit 20 preferably controls the spindle motor drive circuit 29 and the spindle motor drive circuit 29 reduces the number of revolutions of the spindle motor 30, that is, the linear speed of the optical disk 1 below a linear speed at which information is normally recorded (e.g., ½ or below, ⅓ or below or ¼ or below) and more preferably stops the rotation of the optical disk 1.

The above described reduction of the linear speed or stop of rotation may be performed at predetermined timing before the distance control circuit 23 starts controlling the distance between the surface of the SIL 13 and the surface of the optical disk 1 to be constant, for example, for a period after power is turned on or the recording or reproducing operation is started until control for keeping the distance constant is started. As the timing of returning the linear speed of the optical disk 1 to the linear speed when information is normally recorded after the above described reduction of linear speed or stop of rotation, predetermined timing may be adopted such as after the distance between the surface of the SIL 13 and the surface of the optical disk 1 is controlled to be constant or after the focus position is held to the position of the information layer 2.

However, when laser light is focused on the information layer 2 at the moment of switching to the operation of controlling the distance to be constant with the linear speed of the optical disk 1 reduced to below the linear speed when information is normally recorded, the information layer 2 may be heated and already recorded information may be mistakenly erased or destroyed. In the case using the SIL 13 in particular, the equivalent NA becomes greater than 1 and the spot size of laser light at the focus position is reduced, and therefore the information layer 2 may be heated even with extremely feeble laser power.

Therefore, until operation is switched to operation of controlling the distance to be constant, that is, until the distance control circuit 23 starts control so as to keep constant the distance between the surface of the SIL 13 and the surface of the optical disk 1, the focus position adjusting circuit 26 preferably adjusts the focus position so as to prevent the information layer 2 from focusing. For example, the initial value of the focus position may be set at a position sufficiently forward or sufficiently backward from the information layer 2 of the optical disk 1.

With the distance between the surface of the SIL 13 and the surface of the optical disk 1 controlled to be constant, in a focus position moving step S205, the system control circuit 20 switches the switching circuit 28 to the focus position adjusting circuit 26 side and the focus position adjusting circuit 26 drives the actuator 10 to move the focus position of laser light in the optical disk 1 while monitoring a focus error signal from the focus detection circuit 25.

FIG. 3(a) shows a variation of drive current of the actuator 10 after adjustment of the focus position is started. This causes the focus position to move from forward to backward or from backward to forward so as to cross the information layer 2.

As shown in FIG. 3(b), when the focus position approaches the information layer 2, part of the S-figured curve signal is outputted from the focus detection circuit 25 as a focus error signal. Based on this signal waveform, the system control circuit 20 decides whether or not the focus position aligns with the position of the information layer 2. That is, in a focus deciding step S206, the system control circuit 20 decides whether or not the voltage value of the focus error signal in the S-figured curve is a desired value (0 or constant value). When the voltage value is not the desired voltage value, the focus position moving step S205 is repeated and the system control circuit 20 causes the focus position adjusting circuit 26 to further move the focus position of laser light.

When the voltage value has reached the desired voltage value, in a focus controlling step S207, the system control circuit 20 outputs a focus control switching signal shown in FIG. 3(c) to a switching circuit 28 and switches the switching circuit 28 to the focus control circuit 27 side. The focus control circuit 27 controls the actuator 10 so that the focus position is kept to the position of the information layer 2 using a focus error signal from the focus detection circuit 25.

In the above described steps, the SIL 13 can keep constant the distance from the surface of the optical disk 1, generate near field light and keep the light focused on the information layer 2 even when there is a variation in the thickness of the protective layer 3. As a result, information can be recorded and reproduced stably.

As described above, the point in the configuration of the present embodiment is to separate the return light component from the region in which near field light is generated and reflection light component from the information layer 2 (that is, far-field light) from one backward path light and use the lights for different types of control. Since this control is performed only by optical means, a slider used in the conventional configuration is no longer needed and desired control can be realized in a simpler configuration.

Furthermore, the operational point of the present embodiment is to keep constant the distance between the surface of the SIL 13 and the surface of the optical disk 1, generate near field light, and then control the beam expander 9, which is the focus position changing member so as to keep a state in which near field light is focused on the information layer 2.

As a result, the present embodiment provides the special effect of suppressing the occurrence of a defocused state in the information layer 2 even when local varying irregularities occur on the surface of the optical disk 1 or uneven thickness exists in the protective layer 3 without causing erroneous erasure or destruction of information recorded on the information layer 2. Therefore, information can be recorded and reproduced stably and at a high density on the information layer 2 using near field light.

The present embodiment adopts one layer for the information layer of the optical disk 1, but a multilayered disk having two or more information layers may also be adopted. In this case, it is possible to perform appropriate focus control over any information layers having different distances from the SIL 13 by changing the focus position and thereby perform recording into a greater capacity optical disk using near field light.

Embodiment 2

Next, the configuration and operation of Embodiment 2 of the present invention will be explained using the configuration diagram in FIG. 4, flowchart in FIG. 5 and signal diagram in FIGS. 6(a) to 6(d).

Figure 4:
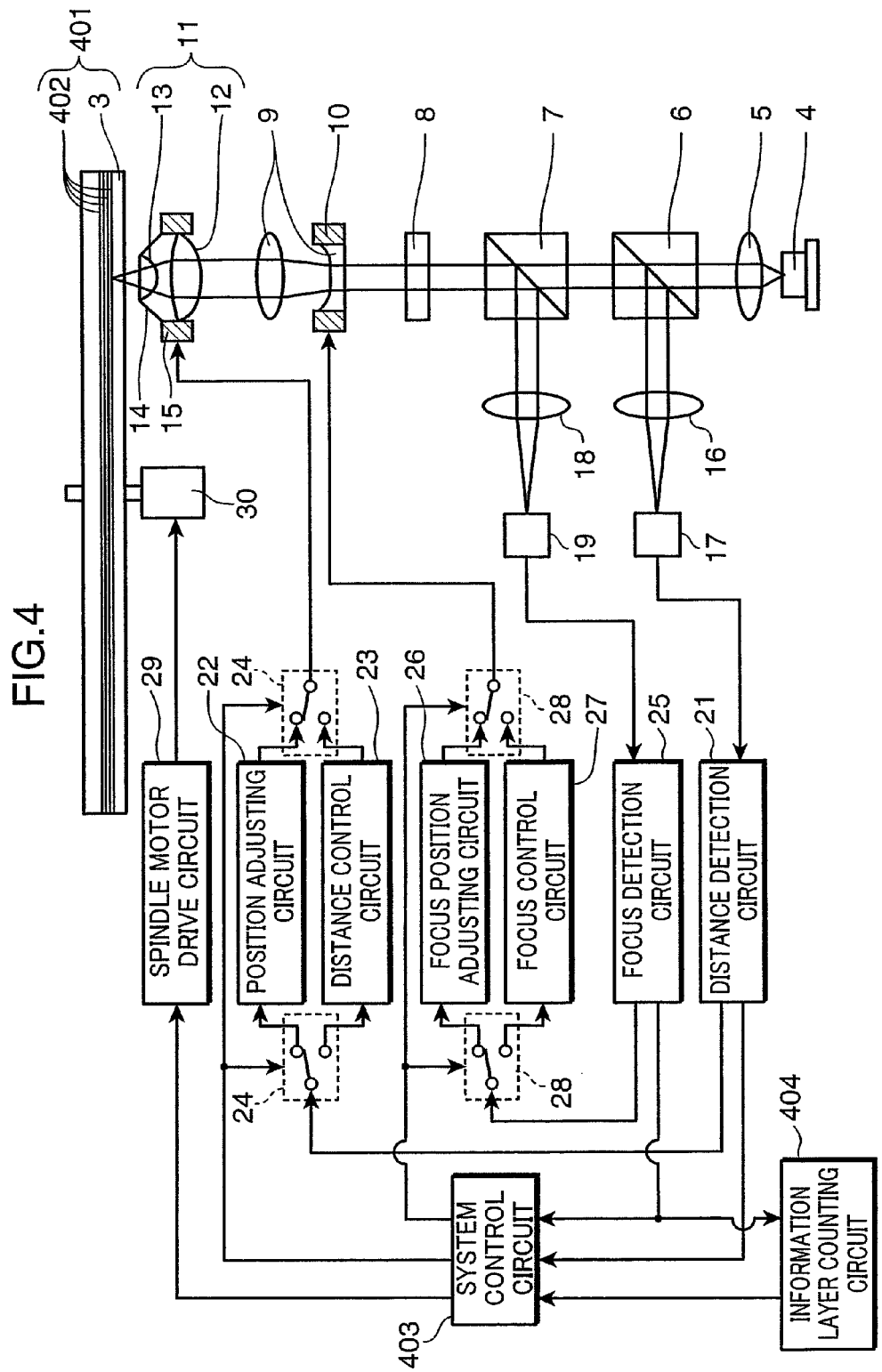
FIG. 4 is a block diagram showing a configuration of an optical information recorder/reproducer according to Embodiment 2 of the present invention.

FIG. 4 illustrates the configuration of the present embodiment. The present embodiment differs from Embodiment 1 in that an optical disk 401 includes a plurality of information layers (e.g., four layers in the present embodiment) 402, that there is provided an information layer counting circuit 404 which outputs a counting signal for a focus on the information layer 402 based on a focus error signal waveform from the focus detection circuit 25 and that a function of performing focus control operation based on the counting result of the information layer counting circuit 404 is added to a system control circuit 403. The rest of the configuration is the same as the optical information recorder/reproducer shown in FIG. 1, and therefore detailed explanations thereof will be omitted.

Figure 5:
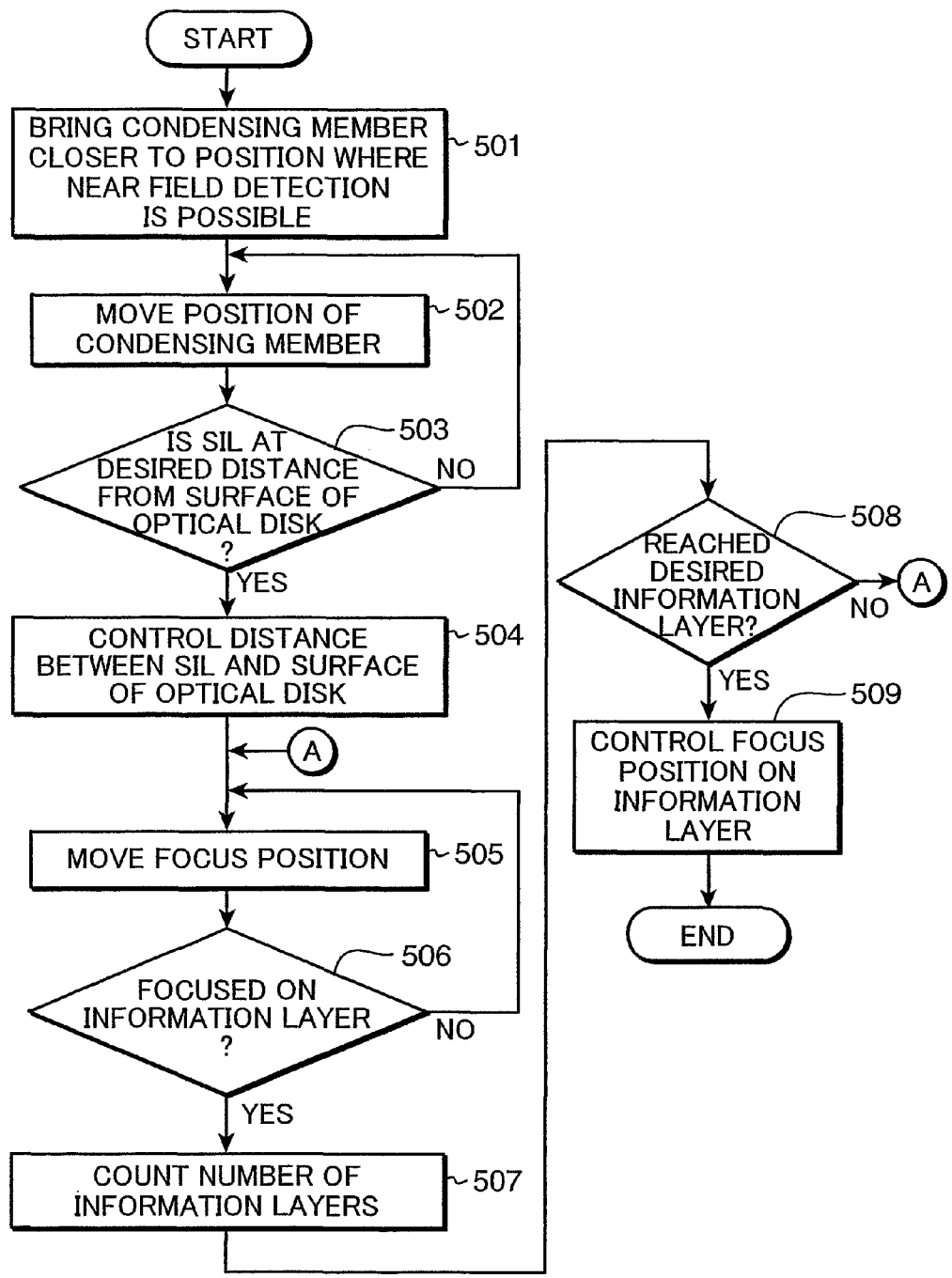
FIG. 5 is a flowchart illustrating the operation of the optical information recorder/reproducer according to Embodiment 2 shown in FIG. 4.

FIG. 5 is a flowchart illustrating the operation of the present embodiment. Steps from a condensing member approaching step S501 to a distance controlling step S504 are the same as steps S201 to S204 according to Embodiment 1 shown in FIG. 2.

In the present embodiment as in the case of Embodiment 1, the linear speed of the optical disk 401 is preferably set to less than the linear speed for when information is normally recorded at the moment of starting the operation of controlling the distance to be constant. Furthermore, at the moment of starting the operation of controlling the distance to be constant, the focus position is more preferably adjusted so that light is not focused on any information layer. For example, the initial value of the focus position may be set to a position sufficiently forward or sufficiently backward from each information layer 402 of the optical disk 401.

FIGS. 6(a) to 6(d) are signal diagrams illustrating the operation of performing focus control on the information layer 402, which is farthest from the incident laser side (that is, the fourth layer) in the present embodiment. FIG. 6(a) shows a drive current of an actuator 10, FIG. 6(b) shows a focus error signal outputted from the focus detection circuit 25, FIG. 6(c) shows a counting signal outputted from the information layer counting circuit 404 and FIG. 6(d) shows a focus and FIG. 6(d) shows a focus control switching signal outputted from the system control circuit 403.

Hereinafter, a series of steps of the present embodiment will be explained. As described above, since the operations from the condensing member approaching step S501 to the distance controlling step S504 are the same as those in Embodiment 1, operations in and after a focus position moving step S505 will be explained.

In the focus position moving step S505 with the position of the SIL 13 controlled so that the distance between the surface of the SIL 13 and the surface of the optical disk 401 is kept to a desired distance, the system control circuit 403 switches the switching circuit 28 to the focus position adjusting circuit 26 side and the focus position adjusting circuit 26 drives the actuator 10 to move the focus position of laser light in the optical disk 401 while monitoring the focus error signal from the focus detection circuit 25.

FIG. 6(a) shows a variation of the drive current of the actuator 10 after the adjustment of the focus position is started. In this way, the focus position is moved in one direction from forward the forefront information layer of the information layers 402 to backward. The moving direction of the focus position may also be opposite (that is, from backward to forward). However, the moving direction of the focus position is preferably not changed until at least the focus position passes through all the information layers 402. This is because, the system control circuit 403 needs to correctly count the number of information layers 402 and correctly decide on which information layer light is eventually focused.

As shown in FIG. 6(b), when the focus position approaches any one layer of the information layers 402, the focus detection circuit 25 outputs an S-figured curve signal as the focus error signal. The information layer counting circuit 404 decides whether or not any one position of the information layer 402 is aligned with the focus position based on this S-figured curve signal (S506).

As shown in FIG. 6(c), the information layer counting circuit 404 outputs a counting signal at timing at which any one position of the information layer 402 is aligned with the focus position. The system control circuit 403 counts the number of information layers 402 based on this counting signal (S507). The method of counting the information layers 402 is not particularly limited to the above described example, and the information layer counting circuit 404 may count the number of information layers 402 and output a signal informing the count, that is, the layer number of the information layer on which laser light is focused, to the system control circuit 403.

Figure 6:
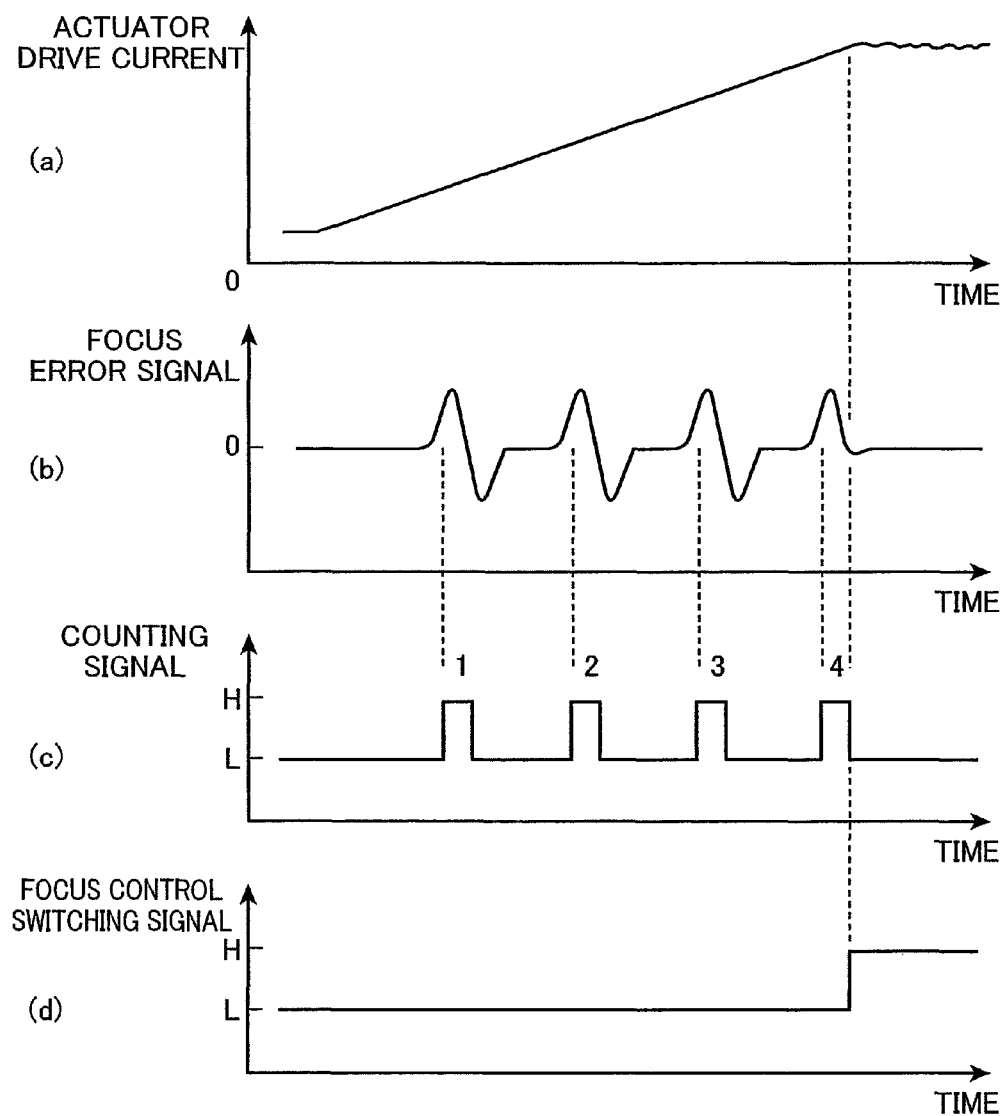
FIG. 6 is a signal waveform diagram showing the operation of focusing on the information layer of the multilayered disk according to Embodiment 2 shown in FIG. 4.

Since the present embodiment performs focus control over the farthest information layer 402 from the incident laser side (that is, the fourth layer), the system control circuit 403 continues to cause the focus position adjusting circuit 26 to move the focus position until the fourth counting signal is received (NO in S508). Upon receiving the fourth counting signal, the system control circuit 403 decides that the fourth information layer 402 is reached (YES in S508) and outputs a focus control switching signal shown in FIG. 6(*d*) to the switching circuit 28. In FIG. 6(*d*), the focus control switching signal is switched from low to high at the falling timing of the counting signal in FIG. 6(*c*), but the focus control switching signal may also be switched from low to high at the rising timing of the counting signal.

The switching circuit 28 is switched to the focus control circuit 27 side based on the focus control switching signal. The focus control circuit 27 controls the actuator 10 so as to keep the focus position at the position of the fourth information layer 402 using the focus error signal from the focus detection circuit 25 (S509).

In the above described steps, the SIL 13 can generate near field light while keeping constant the distance from the surface of the optical disk 401 and the present embodiment can correctly decide, even in the case where the optical disk 401 is a multilayered disk having a plurality of information layers 402, on which of the plurality of information layers 402 light is focused and appropriately keep the state in which light is focused on the information layer.

As described above, the point of the present embodiment is to move the focus position of laser light under a condition that the distance between the surface of the SIL 13 and the surface of the optical disk 401 is kept constant using return light from a region where near field light is generated and near field light is generated, count the state of focus on each layer of the information layers 402 using reflection light from the information layer 402, select a desired information layer based on the counting result and control the beam expander 9, which is the focus position changing member so as to keep the state in which near field light is focused on the selected information layer.

As a result, the present embodiment provides the special effect of being able to appropriately select an information layer also for a multilayered disk having a further increased capacity and stably record or reproduce information into/from each layer of the information layers 402 using near field light without causing erroneous erasure or destruction of the information recorded on any information layer even if local varying irregularities occur on the surface of the optical disk 401 or uneven thickness exists in the protective layer 3.

Furthermore, even in the case of an optical disk where the respective information layers 402 have the same header information (or control data information) as pit shapes or groove wobble shapes, the present embodiment also provides the effect of being able to appropriately select an information layer by counting focused states. Such an optical disk eliminates the necessity for reshaping different pits and groove wobbles which vary from one information layer to another in the manufacturing steps, and thereby has the merit of making manufacturing easier.

Furthermore, the above described embodiments may also add a tilt controlling step of controlling the inclination of the SIL according to the warpage of the optical disk after the distance controlling step S204 (or S504). In this case, there is an advantage of being able to further reduce the possibility that the SIL and the optical disk may collide with each other.

The above described method is applicable when the above described optical disk is any one of reproduction-only type, write-once type and rewritable type media that records or reproduces information using near field light by focusing a spot on the information layer. Furthermore, the number of information layers of the multilayered disk is assumed to be four, but any number of layers may be used. Furthermore, a personal computer, server, recorder, player or the like using the optical information recorder of the present invention can also obtain effects similar to those described above.

As described above, the optical information recorder of the present invention adjusts the focus position of laser light using reflection light from the information layer under a condition that the distance between the SIL and the surface of the optical disk is kept constant using return light from a region where near field light is generated and near field light is generated, and performs control so as to keep the state of focus on the information layer. As a result, the above described embodiments provide the special effect of recording and reproducing information stably and at a high density using near field light even when local varying irregularities occur on the surface of the optical disk or uneven thickness exists in the protective layer and preventing erroneous erasure or destruction of information recorded in the information layer.

Summarizing the present invention from the above described embodiments, the optical information recorder/reproducer according to the present invention is an optical information recorder/reproducer that records and/or reproduces information into/from an optical information recording medium having an information layer using near field light, including a condensing member for generating the near field light, a distance detection section that detects the distance between the condensing member and the optical information recording medium using return light from a region where the near field light is generated, a distance control section that controls the distance between the condensing member and the optical information recording medium, a focus position changing member that changes the focus position of the near field light in the optical information recording medium, a focus detection section that detects the state of focus on the information layer using reflection light from the information layer, and a focus control section that focuses the near field light on the information layer, wherein the distance control section controls the distance between the condensing member and the optical information recording medium to be constant based on the detection result of the distance detection section, and the focus detection section detects the focused state and the focus control section controls the focus position changing member such that the near field light is focused on the information layer based on the detection result of the focused state with the distance between the condensing member and the optical information recording medium controlled to be constant.

In this optical information recorder/reproducer, the distance between the condensing member and the optical information recording medium is detected using return light from the region where near field light is generated first and then the distance between the condensing member and the optical information recording medium is controlled to be constant based on this distance detection result. Next, after controlling the distance between the condensing member and the optical information recording medium to be constant, the focus position of near field light in the optical information recording medium is changed, the state of focus on the information layer is detected using reflection light from the information layer and near field light is focused on the information layer based on this focused state detection result, and therefore the focus can be appropriately kept even if the distance between the surface of the optical disk and the information layer varies, making it possible to stably record and reproduce information using near field light.

The condensing member preferably includes a solid immersion lens. In this case, micro spots can be obtained by increasing the NA of the condensing member, and information can thereby be recorded and reproduced at a high density.

The equivalent NA of the condensing member is preferably greater than 1. In this case, near field light can be narrowed down beyond a logical limit value of the NA of a normal optical system, and it is thereby possible to drastically reduce the spot size of converging light and record and reproduce information at a higher density.

It is preferable to further provide a position adjusting section that moves the condensing member closer to the optical information recording medium from a position where the near field light is not generated before the distance control section controls the distance between the condensing member and the optical information recording medium to be constant. In this case, since the condensing member is moved closer from a distance farther than near field before the distance between the condensing member and the optical information recording medium is controlled to be constant, it is possible to safely move the condensing member from a place sufficiently distant from the surface of the optical disk without collision with the surface before controlling the position of the condensing member to a constant distance from the surface of the optical information recording medium.

It is preferable to further provide a focus position adjusting section that adjusts the position of the focus position changing member such that the near field light is not focused on the information layer until the distance control section starts to control the distance between the condensing member and the optical information recording medium to be constant. In this case, since near field light is not focused on the information layer until control for keeping constant the distance between the condensing member and the optical information recording medium is started, that is, control is switched such that the distance between the condensing member and the optical information recording medium is kept constant, it is possible to prevent already recorded information from being mistakenly erased or destroyed. Therefore, it is possible to avoid erroneous erasure or destruction of the information layer of the optical information recording medium and appropriately keep focus on the information layer.

It is preferable to further provide a drive section that drives the optical information recording medium such that the linear speed of the optical information recording medium falls below the linear speed when the information is recorded at timing at which the distance control section starts control for keeping constant the distance between the condensing member and the optical information recording medium. In this case, since the linear speed of the optical information recording medium is set to be lower than the linear speed when the information is recorded at timing at which control for keeping constant the distance between the condensing member and the optical information recording medium is started, that is, at the moment at which control is switched such that the distance between the condensing member and the optical information recording medium is kept constant, it is possible to reduce disturbance due to the driving of the optical information recording medium and prevent the condensing member from colliding with the surface of the optical information recording medium.

It is preferable to further provide a drive section that stops the optical information recording medium at timing at which the distance control section starts control for keeping constant the distance between the condensing means and the optical information recording medium. In this case, since the optical information recording medium is stopped at timing at which control for keeping constant the distance between the condensing member and the optical information recording medium is started, that is, the moment at which control is switched such that the distance between the condensing member and the optical information recording medium is kept constant, it is possible to prevent the occurrence of disturbance due to the driving of the optical information recording medium and reliably prevent the condensing member from colliding with the surface of the optical information recording medium.

The optical information recording medium preferably includes a plurality of information layers. In this case, since any information layer can be selected and focus can be appropriately kept on the information layer, it is possible to further increase the recording capacity of the optical information recording medium.

It is preferable to further provide a focus position adjusting section that controls the focus position changing member so as to change the focus position of the near field light in a specific one direction and an information layer counting section that counts signals indicating states of focus on the information layer based on the focused state detection result, wherein the focus control section controls the focus position changing member such that the near field light is focused on one information layer of the plurality of information layers based on the counting result of the information layer counting section. In this case, since the number of times near field light is focused on the information layer is counted while the focus position is moved in a specific one direction and near field light is focused on one information layer out of the plurality of information layers based on this counting result, it is possible to correctly decide on which information layer of the plurality of information layers near field light is focused.

The respective information layers of the optical information recording medium preferably include the same header information. In this case, since the respective information layers of the optical information recording medium have the same header information, it is possible to easily manufacture an optical information recording medium.

The optical information recording/reproducing method according to the present invention is an optical information recording/reproducing method for recording and/or reproducing information into/from an optical information recording medium having an information layer using near field light generated by a condensing member, including a step of detecting the distance between the condensing member and the optical information recording medium using return light from a region where the near field light is generated, a step of controlling the distance between the condensing member and the optical information recording medium to be constant based on the distance detection result, and a step of changing the focus position of the near field light in the optical information recording medium, detecting the state of focus on the information layer using reflection light from the information layer and focusing the near field light on the information layer based on the focused state detection result with the distance between the condensing member and the optical information recording medium controlled to be constant.

This method allows focus to be kept appropriately even if the distance between the surface of the optical disk and the information layer varies and information can thereby be recorded and reproduced stably using near field light.

The control circuit according to the present invention is a control circuit used for an optical information recorder/reproducer that records and/or reproduces information into/from an optical information recording medium having an information layer using near field light, including a distance detection circuit that detects the distance between a condensing member for generating the near field light and the optical information recording medium using return light from a region where the near field light is generated, a distance control circuit that controls the distance between the condensing member and the optical information recording medium, a focus detection circuit that detects a state of focus on the information layer using reflection light from the information layer, and a focus control circuit that causes the near field light to be focused on the information layer by controlling the focus position changing member that changes the focus position of the near field light in the optical information recording medium, wherein the distance control circuit controls the distance between the condensing member and the optical information recording medium to be constant based on the detection result of the distance detection circuit, and the focus detection circuit detects the focused state and the focus control circuit controls the focus position changing member such that the near field light is focused on the information layer based on the focused state detection result with the distance between the condensing member and the optical information recording medium controlled to be constant.

This control circuit can provide an optical information recorder/reproducer that appropriately keeps focus on an information layer even if local irregularities occur on the surface of the optical disk or the distance between the surface of the optical disk and the information layer varies.

The optical information recorder/reproducer and the optical information recording/reproducing method according to the present invention can appropriately keep a focused state with respect to the information layer even if local irregularities occur on the surface of the optical disk or the distance between the surface of the optical disk and the information layer varies and are particularly suitable for use related to focus control of an optical information recorder/reproducer using near field light.

The invention claimed is:

1. An optical information recorder and reproducer that records information on and reproduces information from an optical information recording medium having an information layer using near field light, comprising:
   a condensing member for generating the near field light;
   a distance detection section that detects a distance between the condensing member and the optical information recording medium using return light from a region where the near field light is generated;
   a distance control section that controls the distance between the condensing member and the optical information recording medium;
   a focus position changing member that changes a focus position of the near field light on the optical information recording medium;
   a focus detection section that detects a state of focus on the information layer using reflection light from the information layer;
   a focus position adjusting section that adjusts a position of the focus position changing member;
   a focus control section that controls the focus position changing member such that the near field light is focused on the information layer; and
   a switching section that selects the focus position adjusting section or the focus control section to adjust the focus position of the near field light on the optical information recording medium,
   wherein the focus position adjusting section adjusts the position of the focus position changing member such that the near field light is not focused on the information layer until the distance control section initiates control to keep the distance between the condensing member and the optical information recording medium constant,
   the distance control section controls the distance between the condensing member and the optical information recording medium to be constant based on the detection result of the distance detection section,
   the focus position adjusting section adjusts the position of the focus position changing member such that the near field light is focused on the information layer with the distance between the condensing member and the optical information recording medium controlled to be constant,
   the switching section switches a focus position adjustment by the focus position adjusting section to a focus control by the focus control section at a timing at which the focus position of the near field light is aligned with the position of the information layer, and
   the focus detection section detects the focused state and the focus control section controls the focus position changing member such that the near field light is focused on the information layer based on the detection result of the focused state with the distance between the condensing member and the optical information recording medium controlled to be constant.

2. The optical information recorder and reproducer according to claim 1, wherein the focus position adjusting section sets a position where the near field light is focused nearer to the information layer when viewed from an incident light side as an initial value.

3. The optical information recorder and reproducer according to claim 1, wherein the focus position adjusting section sets a position where the near field light is focused farther from the information layer when viewed from an incident light side as an initial value.

4. The optical information recorder and reproducer according to claim 1, wherein the condensing member includes a solid immersion lens.

5. The optical information recorder and reproducer according to claim 4, wherein an equivalent Numerical Aperture (NA) of the condensing member is greater than 1.

6. The optical information recorder and reproducer according to claim 1, further comprising:
   a position adjusting section that moves the condensing member closer to the optical information recording medium from a position where the near field light is not generated before the distance control section controls the distance between the condensing member and the optical information recording medium to be constant.

7. The optical information recorder and reproducer according to claim 1, further comprising:

a drive section that drives the optical information recording medium such that a linear speed of the optical information recording medium falls below a predetermined linear speed when the information is recorded at a timing at which the distance control section initiates control to keep constant the distance between the condensing member and the optical information recording medium.

8. The optical information recorder and reproducer according to claim 1, further comprising:
a drive section that stops the optical information recording medium at a timing at which the distance control section initiates control to keep constant the distance between the condensing member and the optical information recording medium.

9. The optical information recorder and reproducer according to claim 1, wherein the optical information recording medium includes a plurality of information layers.

10. The optical information recorder and reproducer according to claim 9, wherein
the focus position adjusting section controls the focus position changing member so as to change the focus position of the near field light in a specific direction; and further comprising:
an information layer counting section that counts signals indicating states of focus on the information layer based on the focused state detection result,
wherein the focus control section controls the focus position changing member such that the near field light is focused on one information layer out of the plurality of information layers based on the counting result of the information layer counting section.

11. The optical information recorder and reproducer according to claim 9, wherein respective information layers of the optical information recording medium include a same header information.

12. An optical information recording and reproducing method for recording information on and reproducing information from an optical information recording medium having an information layer using near field light generated by a condensing member, comprising:
detecting a distance between the condensing member and the optical information recording medium using return light from a region where the near field light is generated;
controlling the distance between the condensing member and the optical information recording medium to be constant based on the distance detection result;
changing the focus position of the near field light on the optical information recording medium;
detecting a state of focus on the information layer using reflection light from the information layer; and
focusing the near field light on the information layer based on the focused state detection result with the distance between the condensing member and the optical information recording medium controlled to be constant,
wherein the position of the focus position changing member for changing the focus position of the near field light in the optical information recording medium is adjusted such that the near field light is not focused on the information layer until control is initiated to keep the distance between the condensing member and the optical information recording medium constant,
the position of the focus position changing member is adjusted such that the near field light is focused on the information layer with the distance between the condensing member and the optical information recording medium controlled to be constant, and
a focus position adjustment of the focus position changing member is switched to a focus control of the focus position changing member at a timing at which the focus position of the near field light is aligned with the position of the information layer.

13. A control circuit used for an optical information recorder and reproducer that records information on and reproduces information from an optical information recording medium having an information layer using near field light, comprising:
a distance detection circuit that detects a distance between a condensing member for generating the near field light and the optical information recording medium using return light from a region where the near field light is generated;
a distance control circuit that controls the distance between the condensing member and the optical information recording medium;
a focus detection circuit that detects a state of focus on the information layer using reflection light from the information layer;
a focus control circuit that causes the near field light to be focused on the information layer by controlling the focus position changing member that changes a focus position of the near field light on the optical information recording medium;
a focus position adjusting circuit that adjusts the position of the focus position changing member; and
a switching circuit that selects the focus position adjusting circuit or the focus control circuit to adjust the focus position of the near field light on the optical information recording medium,
wherein the focus position adjusting circuit adjusts a position of the focus position changing member such that the near field light is not focused on the information layer until the distance control circuit initiates control to keep the distance between the condensing member and the optical information recording medium constant,
the distance control circuit controls the distance between the condensing member and the optical information recording medium to be constant based on the detection result of the distance detection circuit,
the focus position adjusting section adjusts the position of the focus position changing member such that the near field light is focused on the information layer with the distance between the condensing member and the optical information recording medium controlled to be constant,
the switching section switches a focus position adjustment by the focus position adjusting section to a focus control by the focus control section at a timing at which the focus position of the near field light is aligned with the position of the information layer, and
the focus detection circuit detects the focused state and the focus control circuit controls the focus position changing member such that the near field light is focused on the information layer based on the focused state detection result with the distance between the condensing member and the optical information recording medium controlled to be constant.

* * * * *